United States Patent [19]

Kobayashi

[11] Patent Number: 4,978,155
[45] Date of Patent: Dec. 18, 1990

[54] ELECTRIC ACTUATOR FOR DOOR LOCK

[75] Inventor: Fumio Kobayashi, Yokohama, Japan

[73] Assignee: Ohi Seisakusho Co., Ltd., Yokohama, Japan

[21] Appl. No.: 344,379

[22] Filed: Apr. 28, 1989

[30] Foreign Application Priority Data

May 18, 1988 [JP] Japan ................ 63-64454[U]

[51] Int. Cl.$^5$ .................. E05C 3/26; E05C 17/56
[52] U.S. Cl. ........................... 292/336.3; 292/201
[58] Field of Search ............ 292/336.3, 201, DIG. 22, 292/216, 341.16

[56] References Cited

U.S. PATENT DOCUMENTS 4,290,634  9/1981  Gelhard ............... 292/DIG. 22 X
4,708,378  11/1987  Ingerhoven ..................... 292/201

FOREIGN PATENT DOCUMENTS 2657543  6/1978  Fed. Rep. of Germany ... 292/DIG. 22 X
54-30317  9/1979  Japan .
2057546  4/1981  United Kingdom ... 292/DIG. 22 X Primary Examiner—Richard E. Moore
Attorney, Agent, or Firm—Foley & Lardner, Schwartz, Jeffery, Schwaab, Mack, Blumenthal & Evans

[57] ABSTRACT

An electric actuator for actuating a door lock comprises an electric motor having a drive shaft and an output shaft arranged coaxial with the drive shaft, the output shaft having a helical ridge formed thereabout. A clutch is interposed between the drive shaft and the output shaft, the clutch permitting only a power transmission from the drive shaft to the output shaft. An operation rod having a threaded bore is operatively engaged with the helical ridge of the output shaft, the operation rod being adapted to connect with an operation lever of the door lock; and a rotation suppressing structure suppresses rotation of the operation rod about its axis even when the output shaft is rotated about its axis.

12 Claims, 2 Drawing Sheets

ELECTRIC ACTUATOR FOR DOOR LOCK

BACKGROUND OF THE INVENTION

1. Field of the Invention

The present invention relates in general to automotive door locks, and particularly, to electric actuators of the door locks, which carry out locking and unlocking operations of the door lock with an aid of electric power.

2. Description of the Prior Art

In order to clarify the task of the present invention, one of conventional electric actuators of the above-mentioned type will be outlined which is disclosed in Japanese Utility Model Second Provisional Publication No. 54-30317.

The electric actuator of the publication is so designed as to drive an operation lever of the door lock by means of both a manual labor and a power produced by an electric motor.

For permitting both the manual operation and electrically powered operation, the actuator has a speed reduction device which comprises a gear driven by an electric motor and a sector gear meshed with the gear, and a lost-motion mechanism which is arranged between the sector gear and the operation lever. A biasing spring is further employed for biasing the lost-motion mechanism toward its neutral position.

With this arrangement, a manual operation of the operation lever via a locking knob is permitted without actuating the speed reduction device and the motor.

However, due to its inherent construction, the conventional electric actuator has the following drawbacks.

That is, the lost-motion stroke of the lost-motion mechanism is considerably large as compared with the effective stroke of the operation lever, which causes a bulky construction of the actuator. Furthermore, employment of the biasing spring makes the actuator complicated in construction.

SUMMARY OF THE INVENTION

It is therefore an object of the present invention to provide an electric actuator of a door lock, which is free of the above-mentioned drawbacks.

According to the present invention, there is provided an electric actuator which is simple and compact in construction and effecient in operation.

According to one aspect of the the present invention, there is provided an electric actuator for actuating a door lock, which comprises an electric motor having a drive shaft; an output shaft arranged coaxial with the drive shaft, the output shaft having a helical ridge formed thereabout; a clutch interposed between the drive shaft and the output shaft, the clutch permitting only a power transmission from the drive shaft to the output shaft; an operation rod having a threaded bore operatively engaged with the helical ridge of the output shaft, the operation rod being adapted to connect with an operation lever of the door lock; and rotation suppressing means for suppressing rotation of the operation rod about its axis even when the output shaft is rotated about its axis.

According to another aspect of the present invention, there is provided a door lock system which comprises a door lock proper having an operation lever pivotally connected thereto; a locking knob pivotally connected to the operation lever; an electric motor having a drive shaft; an output shaft arranged coaxial with the drive shaft, the output shaft having a helical ridge formed thereabout; a clutch interposed between the drive shaft and the output shaft, the clutch permitting only a power transmission from the drive shaft to the output shaft; and an operation rod having a threaded bore operatively engaged with the helical ridge of the output shaft, the operation rod having a portion to which the operation lever of the door lock proper is pivotally connected.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
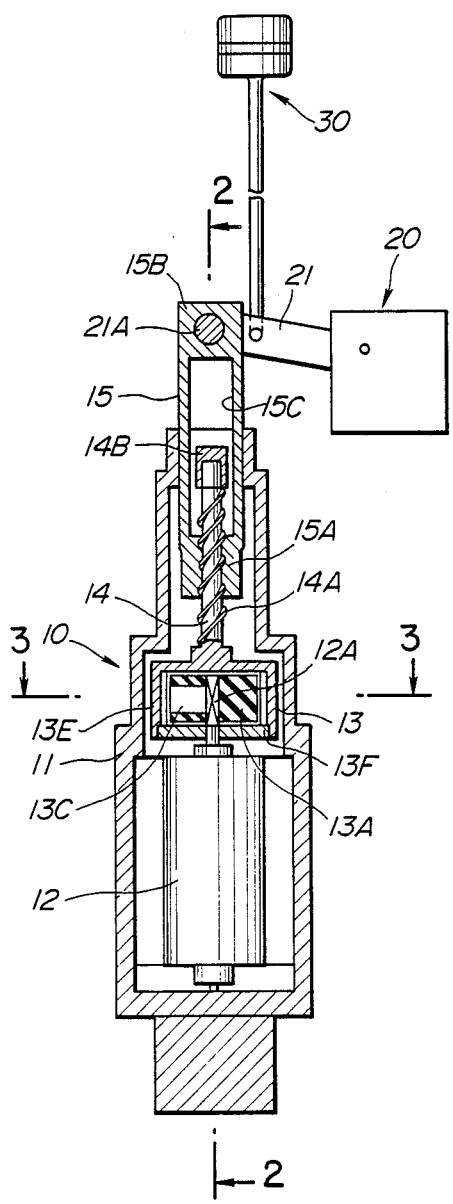
FIG. 1 is a sectional view of an electric actuator according to the present invention.

Referring to the accompanying drawings, particularly FIG. 1, there is shown an electric actuator of the present invention, which is generally designated by numeral 10. The actuator 10 is arranged to incorporate with a door lock 20. The door lock 20 has an operation lever 21 pivotally connected thereto. The lock 20 assumes "LOCK" and "UNLOCK" conditions in response to downward and upward pivoting movements of the operation lever 21. A locking knob 30, which is located at an upper portion of a door body (not shown), has a plunger part pivotally connected to the operation lever 21, so that downward and upward movements of the locking knob 30 carried out by an operator (viz., a passenger in the vehicle) induce the "LOCK" and "UNLOCK" conditions of the lock 20, respectively.

The operation lever 21 is operatively connected to the electric actuator 10 in such a manner as will be clarified as the description proceeds.

Figure 2:
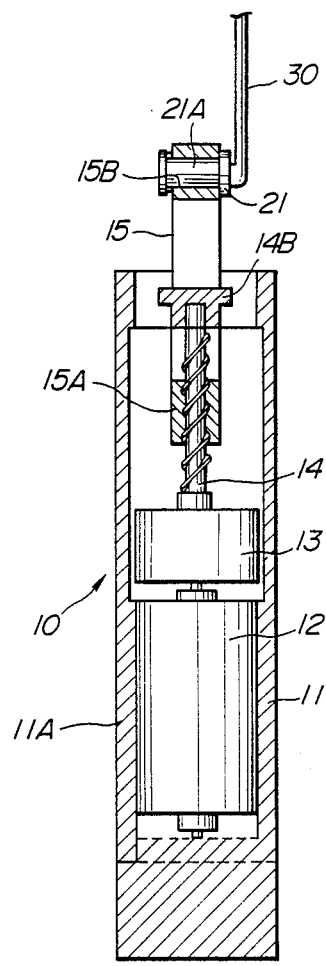
FIG. 2 is a sectional view taken along the line 2—2 of FIG. 1.

The electric actuator 10 comprises a casing 11 which has a cover 11A (see FIG. 2) detachably connected thereto. An electric motor 12 is installed in the casing 11, which has a ferrous drive shaft 12A connected through a centrifugal clutch 13 to an output shaft 14. As shown in FIG. 1, the drive shaft 12A and the output shaft 14 are aligned on a common axis.

Figure 3:
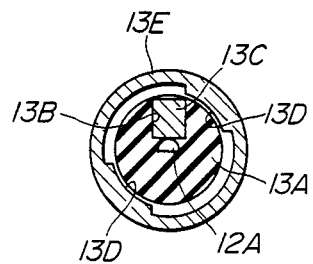
FIG. 3 is a sectional view taken along the line 3—3 of FIG. 1.

As is understood from FIG. 3, the centrifugal clutch 13 comprises a rotor 13A which is coaxially connected to the drive shaft 12A of the motor 12, a magnet 13C which is slidably received in a radially extending bore 13B formed in the rotor 13A and a rounded housing 13E which houses therein the rotor 13A and has at diametrically opposed inner portions respective projections 13D and 13D. The housing 13E is coaxially and integrally connected to the output shaft 14 to rotate therewith about the common axis. The lower open end of the housing 13E is plugged with an apertured circular cover 13F (see FIG. 1).

As will be seen from FIG. 3, when the rotor 13A is at a standstill, the magnet 13C is kept deeply in the bore 13B due to a magnetic attraction thereof relative to the ferrous drive shaft 12A. Thus, under this condition, the centrifugal clutch 13 assumes a disengaged or "OFF"

condition. When the rotor 13A rotates at a speed higher than a certain degree, the magnet 13C projects outwardly due to a centrifugal force generated against the attraction, and instantly engages with one of the projections 13D and 13D of the rounded housing 13E. Thus, under this condition, the centrifugal clutch 13 assumes an engaged or "ON" condition.

The output shaft 14 has a helical or spiral ridge 14A formed thereabout. Operatively engaged with the spiral ridge 14A is a threaded bore formed in a lower part 15A of an operation rod 15. The operation rod 15 is axially slidably held by an upper part of the casing 11. The operation rod 15 has an upper part pivotally connected to the afore-mentioned operation lever 21 of the door lock 20. That is, the upper part of the operation rod 15 is formed with a bore 15B in which a pin 21A fixed to a leading end of the operation lever 21 is journalled.

It is to be noted that the helical angle of the helical ridge 14A and that of the thread of the threaded bore of the operation rod 15 are about 45 degrees. Thus, a so-called "bidirectional power transmission" is achieved in that a rotation of the output shaft 14 thereabout induces an axial movement of the operation rod 15, and in addition to this, an axial movement of the operation rod 15 induces a rotation of the output shaft 14 thereabout. Preferably, the helical ridge 14A is of a multiple thread for reducing bearing stress applied to the meshed portions of the helical ridge 14A of the output shaft 14 and the threaded bore of the operation rod 15.

As is best seen from FIG. 1, the operation rod 15 has at its middle part a rectangular through bore 15C into which a leading end of the outpout shaft 14 projects. The leading end of the output shaft 14 has a cap 14B put thereon which cap is nonrotatably arranged in the bore 15C. That is, for this nonrotatable arrangement of the cap 14B, the cap 14B has laterally extending arms (see FIG. 2) which slidably contact with opposed side walls of the rectangular bore 15C.

When, in operation, the motor 12 is energized to rotate the drive shaft 12A at a certain speed in a certain direction, the centrifugal clutch 13 becomes "ON" and thus the output shaft 14 rotates about its axis. Thus, the operation rod 15 is moved axially upward or downward to achieve the "UNLOCK" or "LOCK" condition of the door lock 20. During this movement, the locking knob 30 is moved upward or downward.

When the "ON" or "OFF" condition of the door lock 20 is achieved, the energization of the motor 12 is ceased. Thus, the centrifugal clutch 13 becomes disengaged or "OFF", and thus thereafter, the "ON" or "OFF" condition of the door lock 20 is maintained.

When now manual operation of the door lock 20 is required, the locking knob 30 is manipulated to move downward or upward. With this, the operation lever 21 of the door lock 20 is pivoted downward or upward cancelling or reversing the "UNLOCK" or "LOCK" condition which the door lock 20 has assumed. Although the downward or upward movement of the locking knob 30 induces a rotation of the output shaft 14 and thus that of the rounded housing 13E of the centrifugal clutch 13, the clutch 13 keeps its "OFF" condition having no undesirable effect on the movement of the locking knob 30.

As will be understood from the foregoing description, in accordance with the present invention, the stroke of the operation rod 15 needed for achieving the "UNLOCK" and "LOCK" conditions of the door lock 20 is substantially equal to the effective stroke of the operation lever 21, unlike the case of the afore-mentioned conventional actuator. Thus, the electric actuator 10 of the invention can be constructed compact.

The coaxial arrangement of the drive shaft 12A, output shaft 14 and operation rod 15 brings about an effective power transmission from the motor 12 to the operation lever 21 of the door lock 20.

Furthermore, since the invention uses no means corresponding to the speed reduction device and biasing spring of the afore-mentioned conventional actuator, simple, compact and light weight construction is achieved in the present invention.

If desired, an electromagnetic clutch may be used in place of the centrifugal clutch 13.

What is claimed is:

1. An electric actuator for actuating a door lock, comprising:
   an electric motor having a drive shaft;
   an output shaft arranged coaxially with said drive shaft, said output shaft having a helical ridge formed thereabout;
   a clutch means interposed between said drive shaft and said output shaft for permitting a power transmission only from said drive shaft to said output shaft;
   an operation rod having a threaded bore operatively engaged with the helical ridge of the output shaft, said operation rod being adapted to connect with an operation lever of the door lock; and
   rotation suppressing means for suppressing rotation of said operation rod about its axis even when said output shaft is rotated about its axis.

2. An electric actuator as claimed in claim 1, in which said clutch comprises a centrifugal clutch which comprises:
   a rotor coaxially connected to said drive shaft to rotate therewith, said drive shaft being constructed of a ferrous material;
   a magnet slidably received in a radially extending bore housing which houses said rotor therein and which is coaxially connected to said output shaft, said housing having a diametrically opposed inner portions respective projections.

3. An electric actuator as claimed in claim 2, in which said rounded housing is integral with said output shaft.

4. An electric actuator as claimed in claim 3, in which said operation rod is formed with a through bore into which a leading end of said output shaft projects.

5. An electric actuator as claimed in claim 4, in which said leading end of said output shaft has a cap mounted thereon, said cap having laterally extending arms which slidably contact with opposed side walls of said through bore of said operation rod.

6. An electric actuator as claimed in claim 5, in which said rotation suppressing means comprises a part of a casing of said electric actuator to which part said operation rod axially slidably contacts.

7. A door lock system comprising:
   a door lock proper having an operation lever pivotally connected thereto;
   a locking knob pivotally connected to said operation lever;
   an electric motor having a drive shaft;
   an output shaft arranged coaxial with said drive shaft, said output shaft having a helical ridge formed thereabout;
   a clutch means interposed between said drive shaft and said output shaft for permitting a power transmission only from said drive shaft to said output shaft; and an operation rod having a threaded bore operatively engaged with the helical ridge of the output shaft, said operation rod having a portion to which said operation lever of said door lock proper is pivotally connected.

8. A door lock system as claimed in claim 7, in which said clutch means comprises a centrifugal clutch which comprises:

a rotor coaxially connected to said drive shaft to rotate therewith, said drive shaft being constructed of a ferrous material;

a magnet slidably received in a radially extending bore formed in said rotor; and a rounded housing which houses said rotor therein and which is coaxially connected to said output shaft, said housing having a diametrically opposed inner portions respective projections.

9. A door lock device as claimed in claim 8, in which said rounded housing is integral with said output shaft.

10. A door lock device as claimed in claim 9, in which said operation rod is formed with a through bore into which a leading end of said output shaft projects.

11. A door lock device as claimed in claim 10, in which said leading end of said output shaft has a cap put thereon, said cap having laterally extending arms which slidably contact with opposed side walls of said through bore of said operation rod.

12. An electric actuator for actuating a door lock, said actuator comprising:

an electric motor having a drive shaft;

an output shaft arranged coaxially with said drive shaft and driven by said drive shaft, said output shaft having a helical ridge formed thereabout;

an operation rod connected to an operation lever on said door lock and having a threaded bore operatively engaged with said helical ridge; and rotation suppressing means for suppressing rotation of said operation rod about its axis even when said output shaft is rotated about its axis.

* * * * *